US008317433B2

(12) United States Patent
Dürr

(10) Patent No.: US 8,317,433 B2
(45) Date of Patent: Nov. 27, 2012

(54) UNIVERSALLY USABLE BAR CUTTER HEAD AND USE THEREOF

(75) Inventor: Alexander Dürr, Saline, MI (US)

(73) Assignee: Klingelnberg AG, Zürich (CH)

( * ) Notice: Subject to any disclaimer, the term of this patent is extended or adjusted under 35 U.S.C. 154(b) by 491 days.

(21) Appl. No.: 12/607,332

(22) Filed: Oct. 28, 2009

(65) Prior Publication Data

US 2010/0111629 A1     May 6, 2010

(30) Foreign Application Priority Data

Oct. 30, 2008   (EP) .................................. 08167925

(51) Int. Cl.
  *B23F 21/00*   (2006.01)
  *B23F 21/12*   (2006.01)
(52) U.S. Cl. ........................... 407/21; 407/20; 407/25
(58) Field of Classification Search .................. 407/20, 407/21, 25, 22, 24; 409/25, 27
  See application file for complete search history.

(56) References Cited

U.S. PATENT DOCUMENTS

| 1,555,482 | A | * | 9/1925 | Pfluger ........................... 409/25 |
| 1,689,565 | A | * | 10/1928 | Trbojevich ..................... 409/26 |
| 1,973,134 | A | * | 9/1934 | Adams ............................ 407/21 |
| 2,107,460 | A | * | 2/1938 | Wildhaber ...................... 409/26 |
| 2,346,807 | A | * | 4/1944 | Wildhaber ...................... 409/26 |
| 2,978,792 | A | * | 4/1961 | Slayton .......................... 407/22 |
| 3,571,876 | A | * | 3/1971 | Blakesley ....................... 407/22 |
| 4,197,038 | A | * | 4/1980 | Hipp et al. ..................... 407/22 |
| 6,311,590 | B1 | * | 11/2001 | Stadtfeld ....................... 82/1.11 |
| 6,632,050 | B2 | * | 10/2003 | Erickson et al. ............... 407/21 |
| 2008/0170915 | A1 | * | 7/2008 | Muhlfriedel ................... 407/27 |

FOREIGN PATENT DOCUMENTS

EP           1 052 049 A2      11/2000

* cited by examiner

*Primary Examiner* — Will Fridie, Jr.

(74) *Attorney, Agent, or Firm* — McCormick, Paulding & Huber LLP

(57) ABSTRACT

Bar cutter head (20) for receiving multiple bar cutters of a first bar cutter set, the bar cutter head (20) having n receptacle openings (25.1-25.6) for receiving n bar cutters of the first bar cutter set, which are all situated along a first concentric cutter head nominal circle having a first cutter head nominal radius (r1). A first spiral-toothed bevel gear (11) can be milled in the single-indexing method in this configuration. The bar cutter head (20) additionally has m receptacle openings (26.1 -26.6) for receiving m bar cutters of a second bar cutter set, which are all situated along a second concentric cutter head nominal circle having a second cutter head nominal radius (r2). A second spiral-toothed bevel gear can be milled in the configuration having the m bar cutters. It is thus a universally-usable cutter head (20).

10 Claims, 8 Drawing Sheets

UNIVERSALLY USABLE BAR CUTTER HEAD AND USE THEREOF

CROSS REFERENCE TO RELATED APPLICATION

This application claims the benefit of European Application No. 08 167 925.0, filed Oct. 30, 2008, the disclosure of which is herein incorporated by reference in its entirety.

FIELD OF THE INVENTION

The present invention relates to bar cutter heads for machining bevel gears, in particular spiral-toothed bevel gears in the single indexing method. The invention also relates to the use of such a universally usable cutter head for machining spiral-toothed bevel gears in the single indexing method.

BACKGROUND OF THE INVENTION

Prior Art

There are various types of bevel gears, these types being differentiated, inter alia, on the basis of the curve of the longitudinal flank lines. The following bevel gears are differentiated according to the curve of the longitudinal flank lines:
  straight-toothed bevel gears
  helically-toothed bevel gears
  spiral-toothed bevel gears.

The term "spiral-toothed bevel gears" was presumably taken from the American, where these bevel gears are generally referred to as "spiral bevel gears". It would be better to use the term "arc-toothed bevel gears" instead of spiral-toothed bevel gears" here, because the spirals already represent a special form of an arc. The term "spiral-toothed bevel gears" is still used hereafter. Bevel gears having axial offset are also referred to as hypoid wheels. When bevel gears are referred to hereafter, those with and without axial offset are meant.

In spiral-toothed bevel gears, a further subdivision in regard to the shape of the longitudinal flank line is possible:
  circular arcs
  extended epicycloids
  involutes
  extended hypocycloids.

Circular-arc-toothed bevel gears have a circular arc as a longitudinal flank line. Circular-arc-toothed bevel gears are manufactured in the single indexing method (also referred to as intermittent indexing method, single indexing process, or face milling). The single indexing method is schematically shown in FIG. 1A. The bar cutters 21 of a bar cutter head 20 complete a movement in the form of a circular arc while the bevel gear 11 to be produced rests at a fixed angle. To manufacture further tooth gaps, the cutter head 20 is retracted and the workpiece 11 is rotated around an indexing angle. The step-by-step further rotation (counterclockwise here) is indicated in FIG. 1A by the arrows A, B, and C. Therefore, one tooth gap is always manufactured at a time. The cutters 21 are all seated along the indexing circle N.

Expanded-epicycloid (also called extended-epicycloid) toothed bevel gears are manufactured by a continuous indexing method (also referred to as continuous hobbing, continuous indexing process, or face hobbing). During the production of the epicycloids in the continuous indexing method, the ratio of tooth count to thread count of the cutter head (number of the cutter groups) corresponds to the ratio of the radius of the main circle G and the radius of the rolling circle R. One refers to an extended epicycloid if the cutter head nominal radius, on which the blades of the cutter are seated, is greater than the radius of the rolling circle R. In this continuous indexing method, both the cutter head 24 and also the workpiece 11 rotate in movement sequences which are chronologically adapted to one another. The indexing is thus performed continuously and all gaps are produced quasi-simultaneously. A corresponding example is shown in FIG. 1B. The cutter head 24 rotates clockwise here, while the workpiece 11 rotates counterclockwise. It can be seen in FIG. 1B that the bar cutters 23 of a corresponding cutter head 24 are typically situated in pairs (in groups). The configuration of the bar cutters 23 is not concentric along the nominal circle N, as in the cutter head 20. It can be seen in FIG. 1B that the rolling circle R of the cutter head 24 rolls along the main circle G of the workpiece 11. M identifies the center point of the cutter head 24 here.

An involute-toothed bevel gear has an involute longitudinal flank line. Such a bevel gear is also manufactured by a continuous indexing method using a special hob in the form of a truncated cone. The method of Klingelnberg which operates according to this principle is called Palloid®.

Examples of bevel gears which are manufactured in the continuous indexing method are the Spiroflex™ and Spirac® bevel gears from Klingelnberg. Spirac refers to a variant of the Spiroflex method.

For the cutter heads which are used for producing bevel gears, one differentiates between so-called bar cutter heads and form cutter heads. A bar cutter head is equipped with multiple bar cutters, each bar cutter having a shaft and a head area. The desired shape and position can be given to the bar cutter by grinding it. Bar cutter heads are more productive than form cutter heads and the bar cutters can be profiled. In contrast, a form cutter head is equipped with form cutters. The form cutters maintain their shape upon dressing. These form cutters have a different shape than the bar cutters and are only dressed on the front. It is an advantage of bevel gear milling using form cutters that a special grinding machine is not required for dressing the form cutters. For example, the known cyclo-palloid method uses form cutters of this type for producing spiral bevel gears.

So-called underlay plates or parallel plates are sometimes used in bar cutter heads and also in form cutter heads in order to the able to correct the radial position of a bar cutter or form cutter. For this purpose, these plates are offered in different thicknesses. The position of a cutter can typically be displaced up to 5 mm outward therewith. The precision of the position of the cutters, the stability of the cutter attachment, and the rigidity of the entire configuration made of cutter head and cutter is impaired by the use of such plates.

There are companies and users who use an array of various certified bevel gears. It is therefore frequently necessary to have a large piece number of corresponding cutter heads in store, in order to be able to produce the particular bevel gears on demand. The cost outlay is especially high in particular if older cutter heads are to be replaced by new bar cutter heads, which may receive newer and more durable bar cutters, or are usable on newer bevel gear cutting machines. The costs may be quite high if all old cutter heads must be replaced by corresponding new bar cutter heads.

The ARGON® cutter head system from Klingelnberg represents an exemplary high-performance cutter head system for the single indexing gear cutting method (single indexing method). A 3.75 inch ARGON® cutter head carries, for example, 11 bar cutter groups each having one inner cutter and one outer cutter per cutter group. An outer cutter removes material from the exterior or concave flank of a tooth gap. An inner cutter removes material from the interior or convex flank of a tooth gap. A total of 22 bar cutters are thus used in this example. Using this cutter head, for example, a module 4.5 bevel gear can be manufactured. If a module 2.5 bevel gear is needed, a different 2.5 inch ARGON® cutter head having a total of 14 bar cutters must be used. Similar examples may be made for cutter head systems of other manufacturers.

The TwinBlade system is also not to be forgotten in this context, in which a cutter generates an entire tooth gap, this system only being able to be applied in the so-called completing process in single indexing.

These examples prove that the tool expenditure can be too large and costly for many users.

Therefore, the invention is based on the object of providing a cost-effective solution, which allows various spiral-toothed bevel gears to be manufacturing using the fewest possible tools.

The object is achieved according to the invention by a bar cutter head as described below. The object is also achieved by using the cutter bar as explained below.

SUMMARY OF THE INVENTION

A bar cutter head according to the invention is designed for receiving multiple bar cutters of a first bar cutter set and a second bar cutter set. The bar cutter head has n frontal receptacle openings for receiving n bar cutters of the first bar cutter set. The n receptacle openings are all situated along a first concentric cutter head nominal circle having a first cutter head nominal radius, in order to be able to mill a first spiral-toothed bevel gear using these n bar cutters in the single indexing method. The bar cutter head additionally has at least m receptacle openings for receiving m bar cutters of the second bar cutter head, which are all situated along a second concentric cutter head nominal circle having a second cutter head nominal radius. If the bar cutter head is equipped with the m bar cutters of the second bar cutter set, a second spiral-toothed bevel gear can be milled in the single indexing method. N and m are whole numbers greater than two and the second cutter head nominal radius is greater than the first cutter head nominal radius.

A use according to the invention of such a bar cutter head provides that this bar cutter head is used for manufacturing spiral-toothed bevel gears having varying tooth geometry. In order to be able to generate different tooth geometries, bar cutter heads having different cutter head nominal radii are needed. This is because the cutter head nominal radius has a great influence on the tooth geometry and the required machine settings. The bar cutter head comprises n receptacle openings for receiving n bar cutters of a first bar cutter set, which are all situated along a first concentric cutter head nominal circle having a first cutter head nominal radius, in order to be able to mill a first spiral-toothed bevel gear using these n bar cutters in the single indexing method. In addition, the bar cutter head additionally comprises at least m receptacle openings for receiving m bar cutters of a second bar cutter set, which are all situated along a second concentric cutter head nominal circle having a second cutter head nominal radius in order to be able to mill a second spiral-toothed bevel gear using only these m bar cutters in the single indexing method. N and m are whole numbers greater than two and the second cutter head nominal radius is greater than the first cutter head nominal radius.

Advantageous embodiments of the invention are inferred from the following descriptions.

Several advantages of the invention are listed hereafter. The cutter head according to the invention is flexibly usable and nonetheless maintains the high precision of a conventional bar cutter head. The high precision is achieved in that there are high-precision recesses for receiving the bar cutters at the various cutter head nominal radii. Each recess can be applied precisely at the desired position using electro-erosion, for example. The recesses are each only as large as they must be in order to receive a bar cutter. Because only relatively small recesses are required, the rigidity of the cutter head remains essentially maintained. If longer, radially oriented recesses were provided, the rigidity would be significantly reduced.

Preferred cutter heads according to the invention are further characterized in that they are implemented as essentially monolithic.

The list of reference numerals is part of the disclosure.

BRIEF DESCRIPTION OF THE DRAWINGS

The figures are described coherently and comprehensively. Exemplary embodiments of the invention are described in greater detail hereafter with reference to the drawings.

DESCRIPTION OF THE PREFERRED EMBODIMENTS

Terms are used in connection with the present description, which are also used in relevant publications and patents. However, it is to be noted that the use of these terms is only to serve for better understanding. The ideas of the invention and the protective scope of the claims are not to be restricted in their extent by the specific selection of the terms. The invention may be transferred readily to other term systems and/or areas of specialization. The terms are to be applied appropriately in other areas of specialization.

Figure 2:
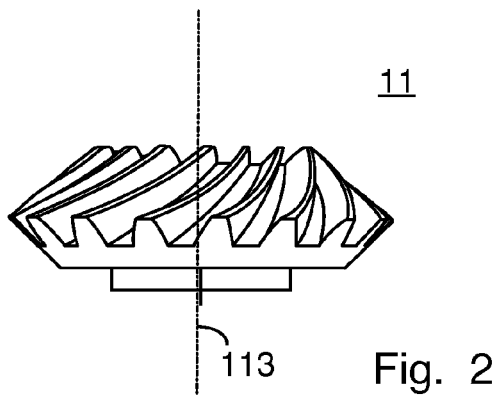
FIG. 2 is a schematic side view of a bevel gear pinion.

The schematic side view of a spiral-toothed bevel gear pinion 11 is shown in FIG. 2. This is a bevel gear pinion 11 having spiraling longitudinal flank lines. The invention may also be applied to the production of other bevel gear pinions 11 and crown wheels (e.g., hypoid bevel gears), which are producible in the single indexing method.

Figure 3:
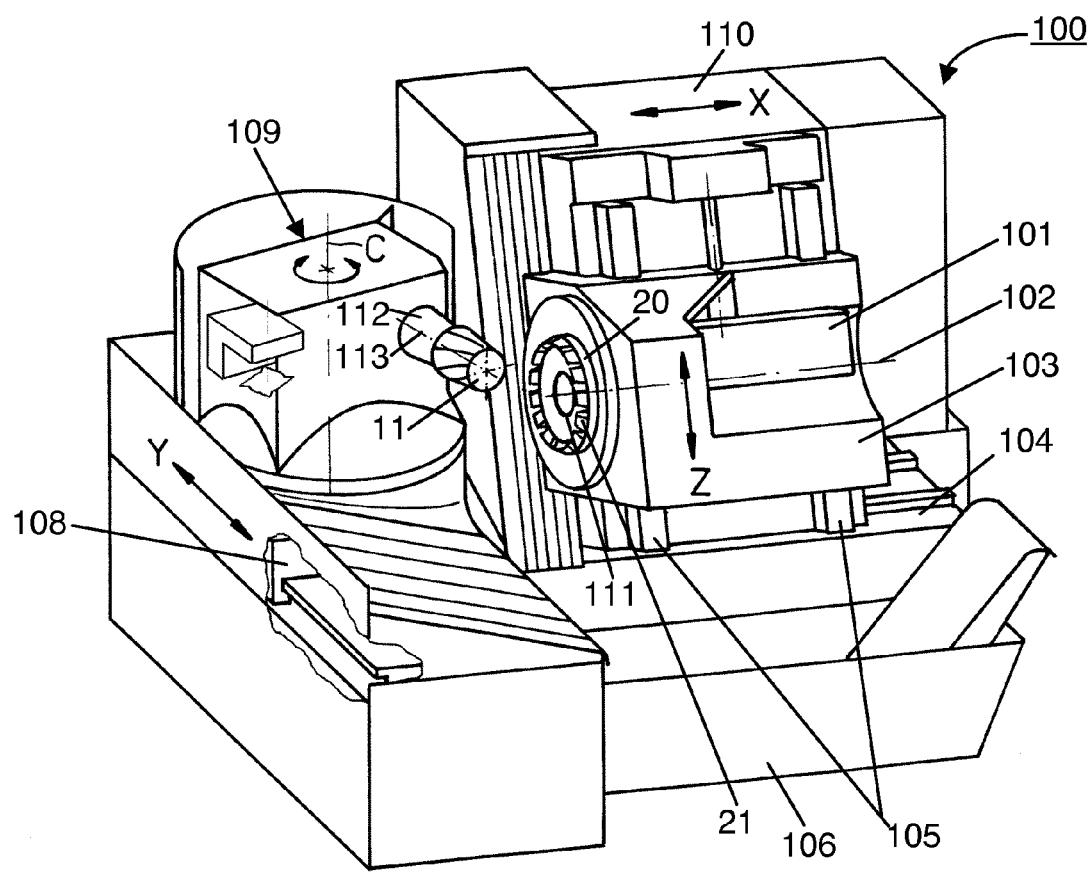
FIG. 3 is a perspective view of a bevel gear cutting machine.

FIG. 3 shows a perspective illustration of the fundamental construction of a corresponding CNC machine 100 (also referred to as a bevel gear cutting machine) for cutting bevel gears 11, preferably spiral-toothed bevel gear pinions 11 and spiral-toothed crown wheels.

The CNC machine 100 can be constructed as follows. A machine housing 110 is guided horizontally and linearly on a machine bed 106 along a linear coordinate axis X (first axis). A first carriage 103 is movable vertically on a guide 105, which is attached to a lateral face of the machine housing 110, along a linear coordinate axis Z (second axis) using a spindle drive 101. A workpiece spindle carrier having a second carriage 108 is guided horizontally and linearly on a guide 107 on the machine bed 104 along a linear coordinate axis Y (third axis), which is perpendicular to the X axis in the CNC machine 100 shown in FIG. 3. A first pivot device 109 having vertical axis C (fourth axis) is located on the carriage 108. The guide 105 of the first carriage 103 and the Z axis are inclined to the vertical in the CNC machine 100 shown in FIG. 3.

The first carriage 103 carries a tool spindle 111, which is mounted so it is rotatable around a tool spindle axis 102 (fifth axis). The tool spindle 111 carries a tool, for example, a cutter head 20 having multiple bar cutters 21 here. A workpiece spindle 112 is horizontally guided and is linearly displaceable and/or pivotable on the machine bed 106 by the second carriage 108 and by the first pivot device 109. The first pivot device 109 carries the workpiece spindle 112, which is rotatable around a workpiece spindle axis 113 (sixth axis). The workpiece spindle 112 carries a workpiece 11, in the present example a spiral-toothed bevel gear pinion 11. The first pivot device 109 is pivotable horizontally guided around the C axis, in order to pivot the workpiece 11 into a machining position. The workpiece spindle 112 can be provided with a chucking device for chucking the workpiece 11.

The principle of the invention will be explained on the basis of FIG. 4. A schematic top view of a bar cutter head 20 is shown, which is designed for the purpose of receiving the bar cutters of two different cutter sets. A receptacle opening 25.1 is provided for the outer cutter of the first cutter set at the position 1. The receptacle opening 25.2 for the inner cutter of this cutter set is located at the position 5. The two bar cutters (i.e., n=2), or the receptacle openings 25.1, 25.2 of this first cutter set are seated on a concentric cutter head nominal circle having cutter head nominal radius r1. For example, r1 is 3.75"/2 (=1.875 inches=47.62 mm) here. The concentric cutter head nominal circles all have a shared center point, which is coincident with the tool spindle axis 102 of the bar cutter head 20. The two bar cutters of this cutter set form a so-called cutter group. A bar cutter group can comprise multiple cutter groups, as explained later.

Furthermore, the bar cutter head 20 is distinguished in that it has receptacle openings 26.1, 26.2 for at least one further cutter set (referred to as the second cutter set) having two bar cutters (i.e., m=2). A receptacle opening 26.1 is provided at the position 3 for the outer cutter of the second cutter set. The receptacle opening 26.2 for the inner cutter of this second cutter set is located at the position 7. The two bar cutters, or the receptacle openings 26.1, 26.2 of the second cutter set, are seated on a concentric cutter head nominal circle having cutter head nominal radius r2. For example, r2 is 5"2 (=2.5 inches=63.5 mm) here.

Figure 4:
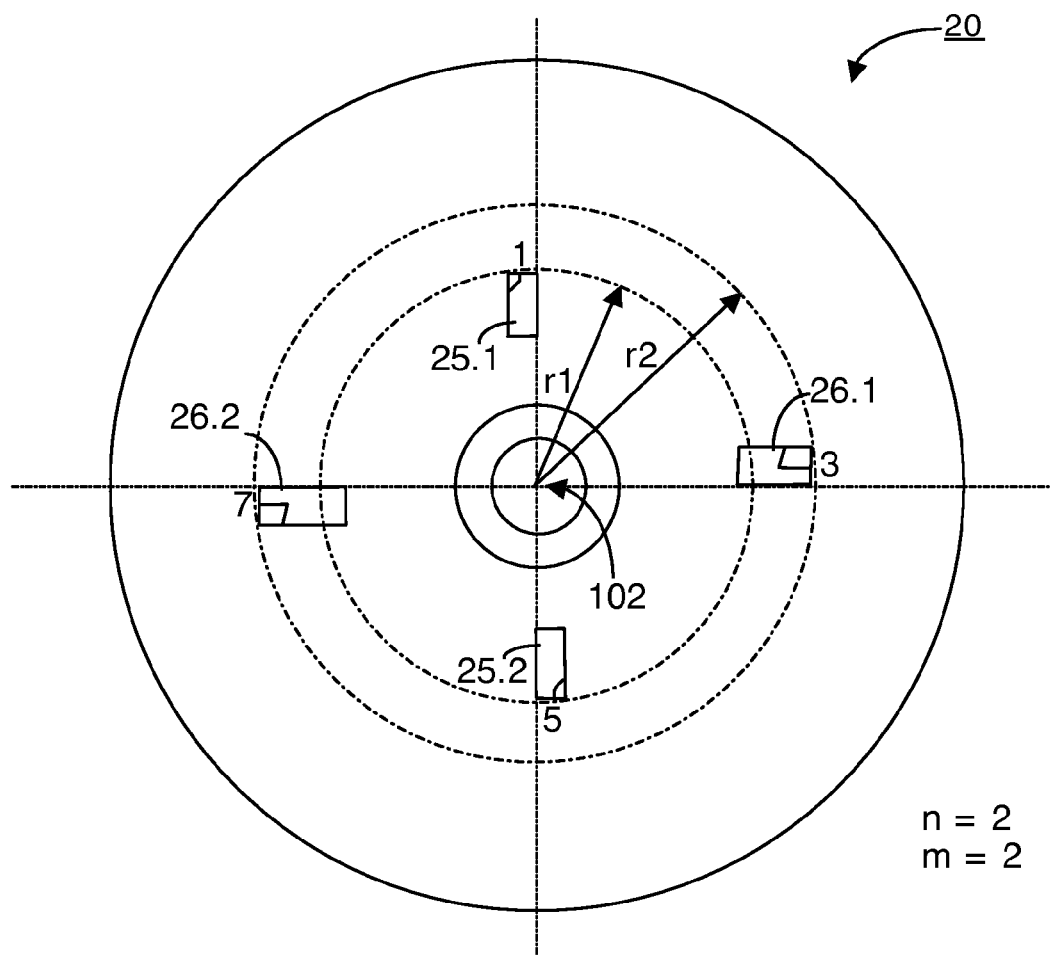
FIG. 4 is a schematic top view of a first cutter head according to the invention.

Such a cutter head 20, which is shown in FIG. 4, can replace two existing cutter heads (a 3.75" and a 5" cutter head). If the cutter head is equipped with the bar cutters of the first cutter set, a first bevel gear 11 having a first tooth geometry can be manufactured. If the cutter head is equipped with the bar cutters of the second cutter set, a second bevel gear having a different tooth geometry can be manufactured.

However, the productivity of such a novel, universally usable cutter head 20 is not particularly great, because only one cutter set having one cutter group is used at a time.

Figure 5:
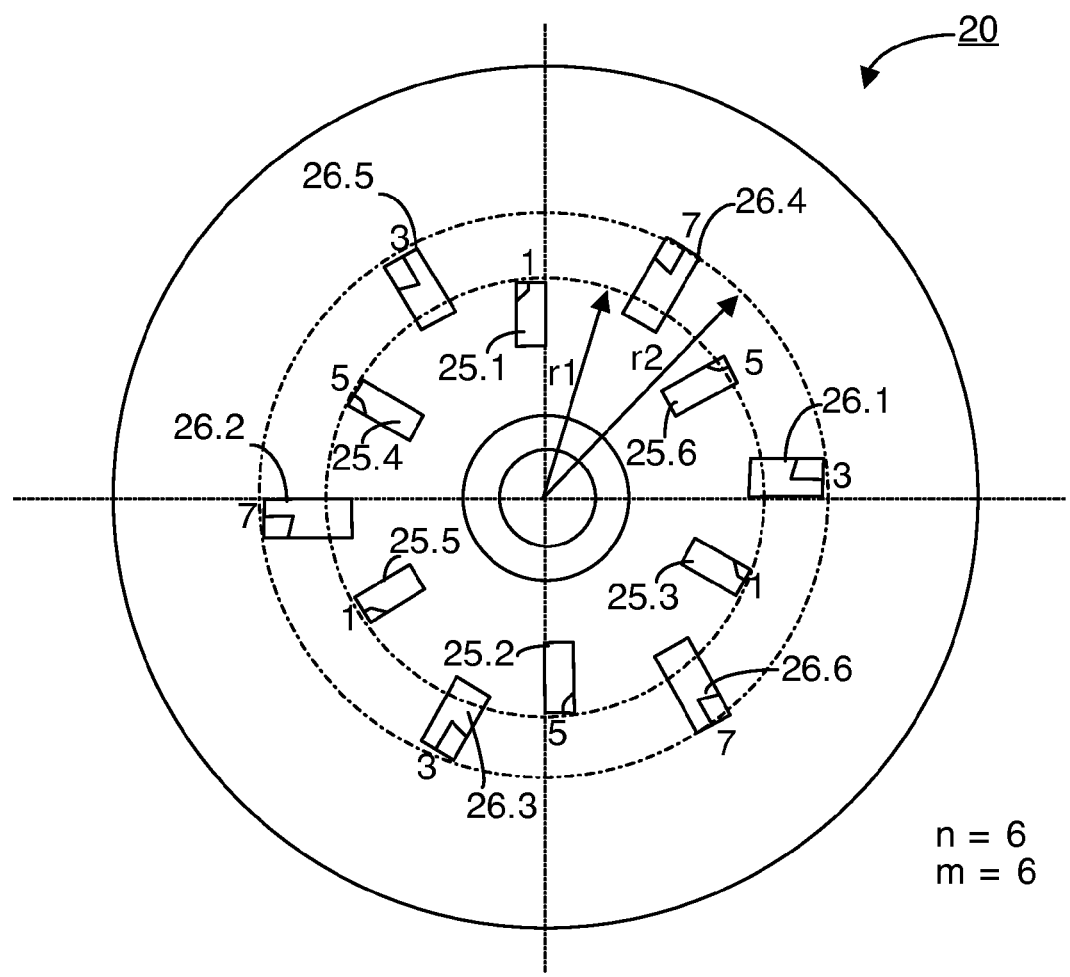
FIG. 5 is a schematic top view of a first cutter head according to the invention.

The significance of the invention will become clearer on the basis of the following figures. The example of a further embodiment is shown in FIG. 5. This is a bar cutter head 20, which has n=6 receptacle openings 25.1-25.6 for the bar cutters of a first cutter set and m=6 receptacle openings 26.1-26.6 for the bar cutters of a second cutter set. The outer cutters of the first cutter set are received in the receptacle openings 25.1, 25.3, 25.5 at the positions 1. The inner cutters of the first cutter set are received in the receptacle openings 25.2, 25.4, 25.6 at the positions 5. The outer cutters of the second cutter set are received in the receptacle openings 26.1, 26.3, 26.5 at the positions 3. The inner cutters of the second cutter set are received in the receptacle openings 26.2, 26.4, 26.6 at the positions 7. The first cutter set and the second cutter set each comprise three cutter groups made of one inner cutter and one outer cutter each.

Because of the significantly higher number of cutter groups, this cutter head has a higher productivity than the cutter head 20 shown in FIG. 4.

Figure 6A:
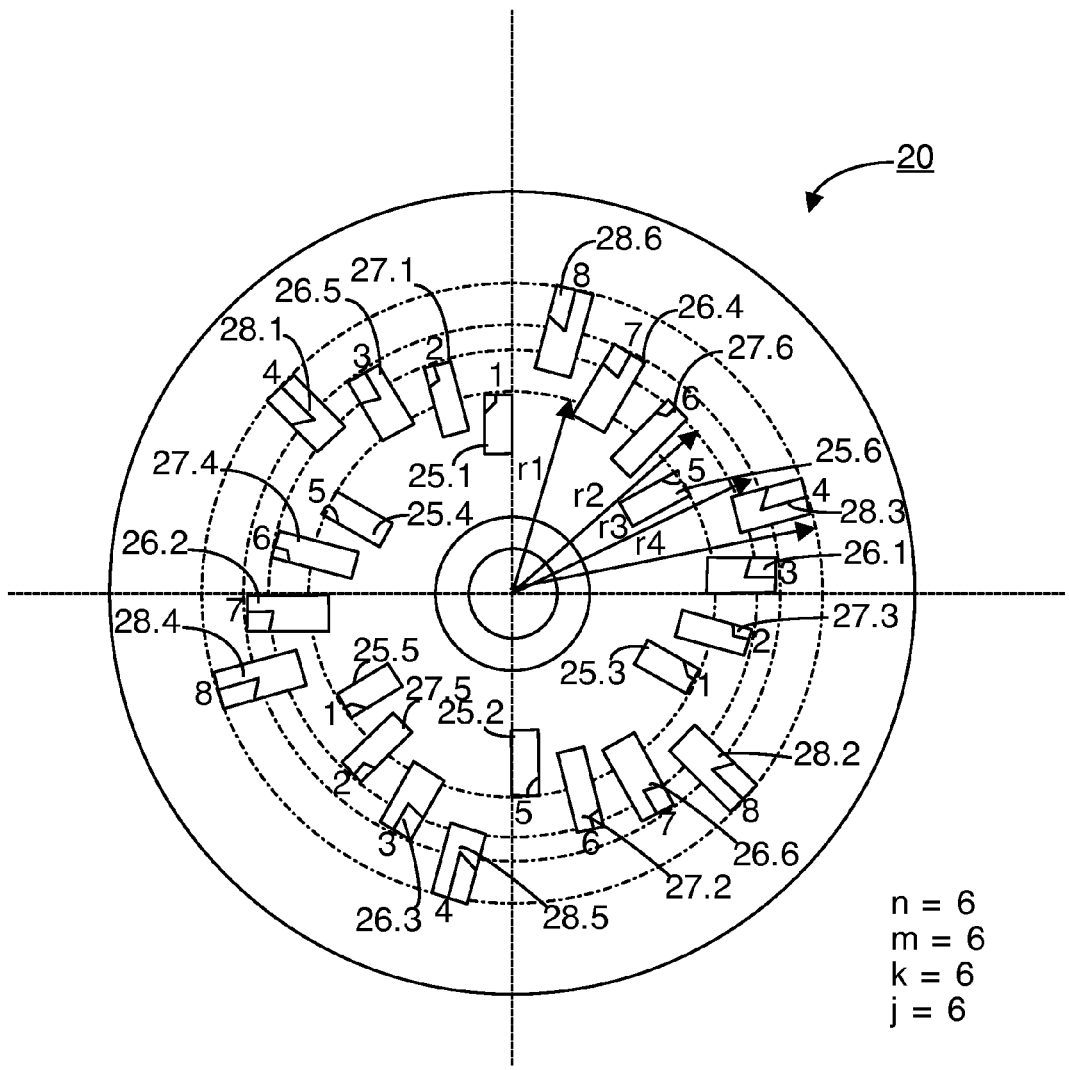
FIG. 6A is a schematic top view of a third cutter head according to the invention.

The example of a further embodiment is schematically shown in FIG. 6A. This is a bar cutter head 20, which has n=6 receptacle openings 25.1-25.6 for the bar cutters of a first cutter set, m=6 receptacle openings 26.1-26.6 for the bar cutters of a second cutter set, k=6 receptacle openings 27.1-27.6 for the bar cutters of a third cutter set, and j=6 receptacle openings 28.1-28.6 for the bar cutters of a fourth cutter set.

The outer cutters of the first cutter set are received in the receptacle openings 25.1, 25.3, 25.5 at the positions 1. The inner cutters of the first cutter set are received in the receptacle openings 25.2, 25.4, 25.6 at the positions 5. The outer cutters of the second cutter set are received in the receptacle openings 26.1, 26.3, 26.5 at the positions 3. The inner cutters of the second cutter set are received in the receptacle openings 26.2, 26.4, 26.6 at the positions 7. The outer cutters of the third cutter set are received in the receptacle openings 27.1, 27.3, 27.5 at the positions 2. The inner cutters of the third cutter set are received in the receptacle openings 27.2, 27.4, 27.6 at the positions 6. The outer cutters of the fourth cutter set are received in the receptacle openings 28.1, 28.3, 28.5 at the positions 4. The inner cutters of the fourth cutter set are received in the receptacle openings 28.2, 28.4, 28.6 at the positions 8.

The cutter sets each comprise three cutter groups made of one inner cutter and one outer cutter each.

The receptacle openings 25.1-25.6 of this first cutter set are seated on a concentric cutter head nominal circle having cutter head nominal radius r1. For example, r1 is 3.75"/2 (=1.875 inches=47.63 mm) here. The receptacle openings 26.1-26.6 of the second cutter set are seated on a concentric cutter head nominal circle having cutter head nominal radius r2, with r2, for example, equal to 5"/2 (=2.5 inches=63.5 mm). The receptacle openings 27.1-27.6 of the third cutter set are seated on a concentric cutter head nominal circle having cutter head nominal radius r3, with r3, for example, equal to 4.375"/2 (=2.1875 inches=55.56 mm). The receptacle openings 28.1-28.6 of the fourth cutter set are seated on a concentric cutter head nominal circle having cutter head nominal radius r4, with r4, for example, equal to 6"/2 (=3 inches=76.2 mm).

A bar cutter head 20 according to the invention is generally designed for receiving multiple bar cutters of a first bar cutter set, the bar cutter head 20 having n receptacle openings 25.1-25.n for receiving the n bar cutters of the first cutter set. The n bar cutters of the first cutter set are all situated along a first concentric cutter head nominal circle having a first cutter head nominal radius r1. If the bar cutter head 20 is equipped with the n bar cutters of the first cutter set, a first spiral-toothed bevel gear can be milled therewith in the single indexing method. The bar cutter head 20 additionally has at least m receptacle openings for receiving m bar cutters of the second cutter set. These m bar cutters of the second cutter set are all situated along a second concentric cutter head nominal circle having a second cutter head nominal radius r2, in order to be able to mill a second spiral-toothed bevel gear using only these m bar cutters in the single indexing method. The cited numbers n and m are whole numbers greater than two. For example, if n is equal to six (see FIG. 5), the receptacle openings 25.1, 25.3, 25.5 for receiving the three inner cutters of the first cutter set have a mutual angle spacing of 120°. The receptacle openings 25.2, 25.4, 25.6 for receiving the three outer cutters of the first cutter set also have a mutual angle spacing of 120°. The angle spacing between a receptacle opening 25.1 for an inner cutter and the following (adjacent) receptacle opening 25.6 for an outer cutter is 360°/n in this example, i.e., the angle is 60°. If m is also equal to six, this statement in regard to the angle specifications also applies similarly for the receptacle openings 26.1-26.6. The three inner cutters of the second cutter set have a mutual angle spacing of 120° and the three outer cutters of the second cutter set also have a mutual angle spacing of 120°.

For example, if n=6 bar cutters are used, three of these bar cutters may be inner cutters and three may be outer cutters. In this case, three cutter groups each having one inner cutter and one outer cutter are used as the first cutter set.

However, two inner cutters, two outer cutters, and two roughing blades can also be used for cutting the tooth gap base. In this case, each cutter set comprises one inner cutter, one outer cutter, and one roughing blade. However, it may also be two inner cutters as finishing blades, two outer cutters as finishing blades, and two roughing blades as roughing cutters. In this case, each cutter set comprises one inner cutter, one outer cutter, and one finishing blade.

These types of cutter distribution into various cutter groups can be used in all embodiments of the invention.

The receptacle openings 26.1-26.6 for receiving the m=6 bar cutters of the second cutter set are situated shifted in angle by at least 15° in relation to the receptacle openings 25.1-25.6 for receiving the n=6 bar cutters of the first cutter set. For example, in FIG. 5 the angle spacing between the receptacle opening 25.1 for the outer cutter (position 1) of the first cutter set and the receptacle opening 26.1 for the outer cutter (position 3) of the second cutter set is 90°. The angle spacing between the receptacle opening 25.1 for the outer cutter (position 1) of the first cutter set and the receptacle opening 26.4 for the inner cutter (position 7) of the second cutter set is 30°.

The cutter head 20 is preferably divided into 15° angle amounts in order to situate the various receptacle openings offset to one another.

Figure 6B:
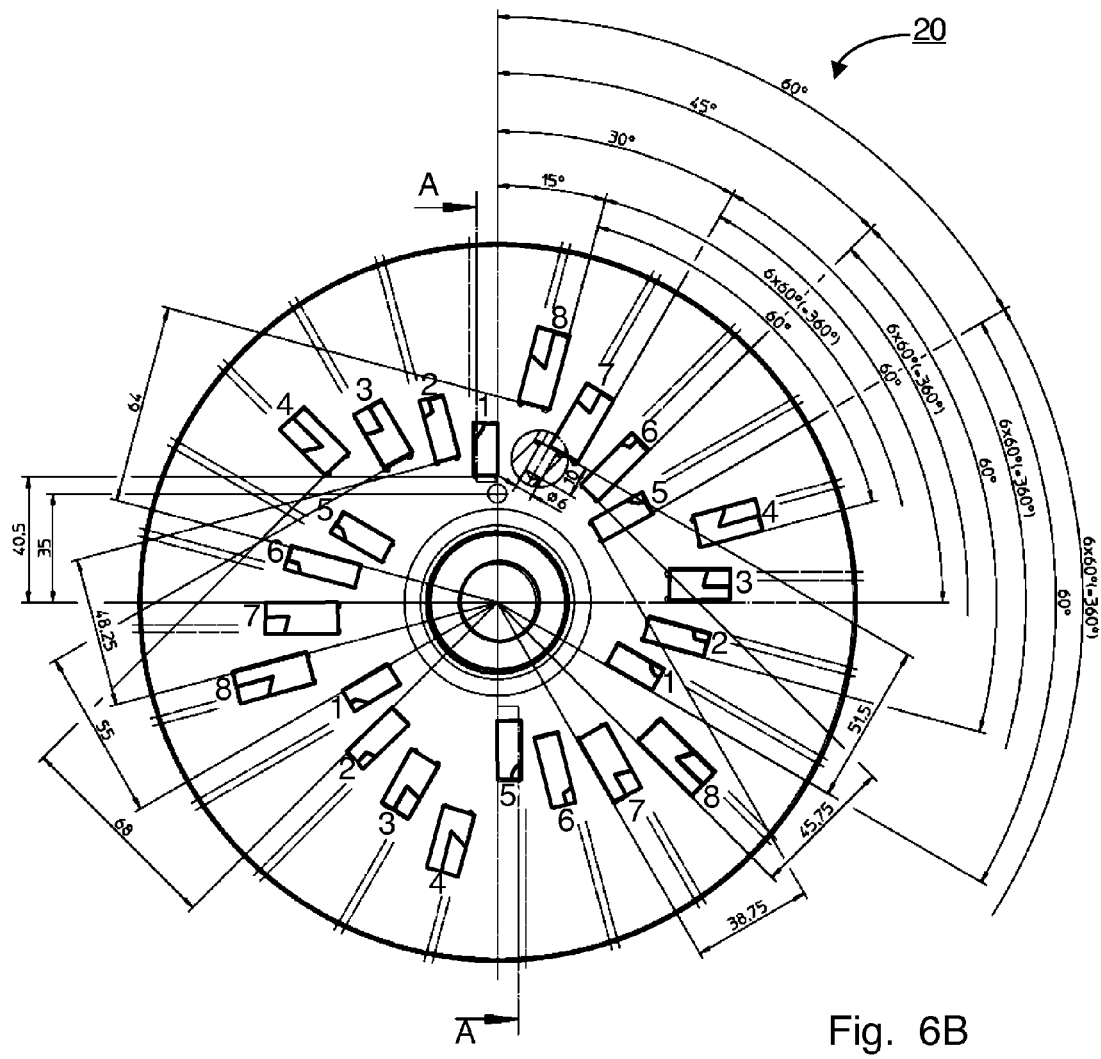
FIG. 6B is a detailed top view of the third cutter head according to the invention.

All of the dimensions of an exemplary cutter head 20 are shown in FIG. 6B, which can receive a total of four cutter sets each having six bar cutters (divided into three cutter groups). Both the individual angles, and also the radii (in millimeters) from the center point (axis 102) to the particular closest point of the various receptacle openings are specified.

The cutter heads according to the invention are preferably provided with radially running screws, in order to be able to fix the individual bar cutters in the corresponding receptacle openings. These screws are seated in radially running fastening holes having internal threads. The position of the individual fastening holes having internal threads is indicated in FIG. 6B by double lines, which extend from the outer circumference of the cutter head 20 radially inward to the receptacle openings. Two clamping screws are preferably used per bar cutter. These two clamping screws are seated one behind another in the axial direction (diagonally). The clamping screws press against the bar cutters and ensure nonpositive fastening thereof.

Figure 6C:
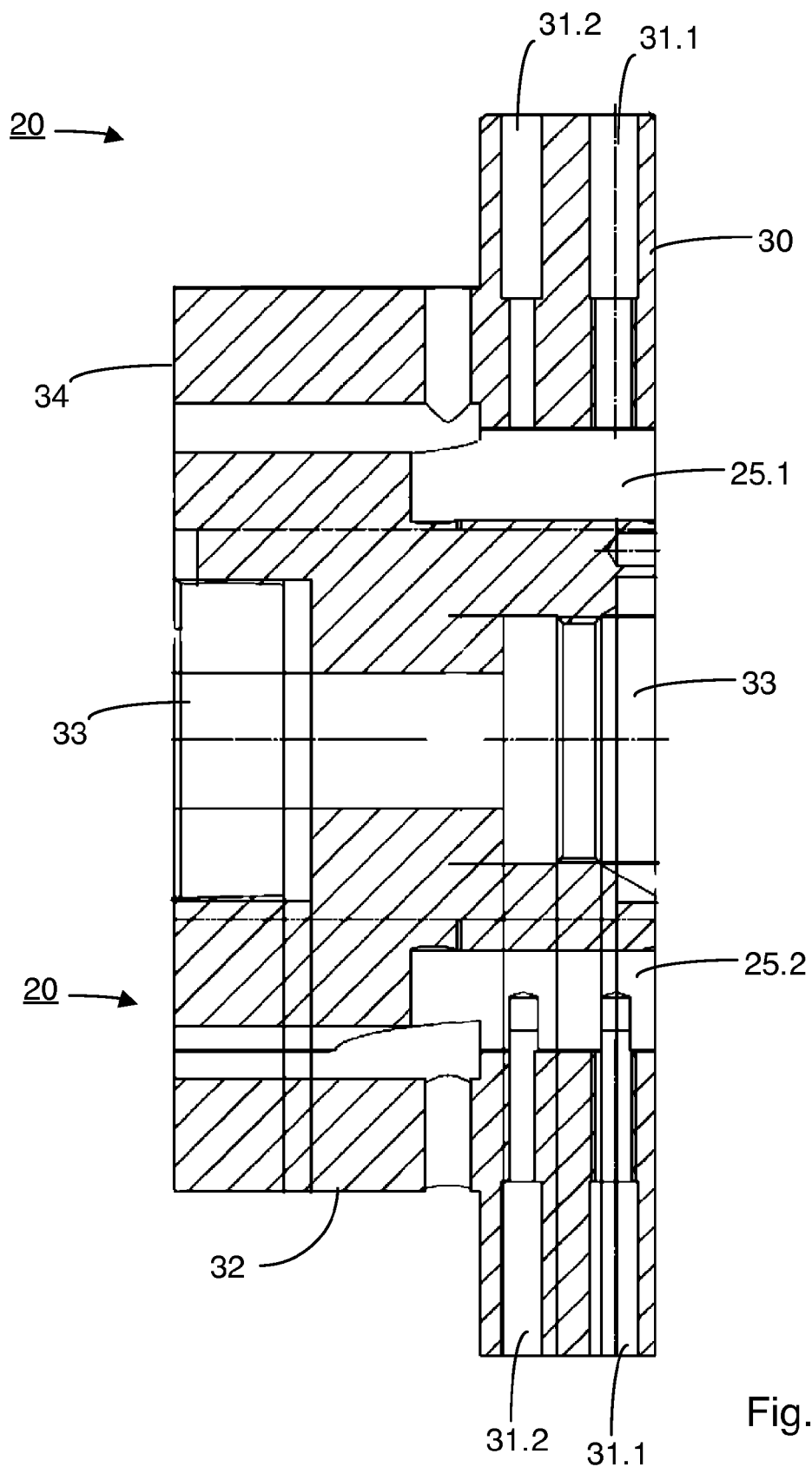
FIG. 6C is a detailed sectional view (section A-A) of the third cutter head according to the invention.

A section along line A-A of FIG. 6B is shown in FIG. 6C. The two fastening holes 31.1, 31.2 are shown in the upper area of FIG. 6C, which are associated with the receptacle opening 25.1 (at position 1). The two fastening holes 31.1, 31.2 in the lower area of FIG. 6B are associated with the receptacle opening 25.2 (at position 5).

As is typical, the cutter head 20 has an essentially cylinder-symmetrical basic shape having a plate-shaped head area 30 and a cylindrical rear area 32. A central hole 33 is provided in the center, in order to be able to fasten the cutter head 20 on a tool spindle (e.g., on a spindle drive 101 in FIG. 2).

The receptacle openings are preferably implemented so that they extend diagonally through the cutter head 20. The receptacle openings are thus visible both on the front side of the head area 30 and also on the rear side 34.

Figure 6D:
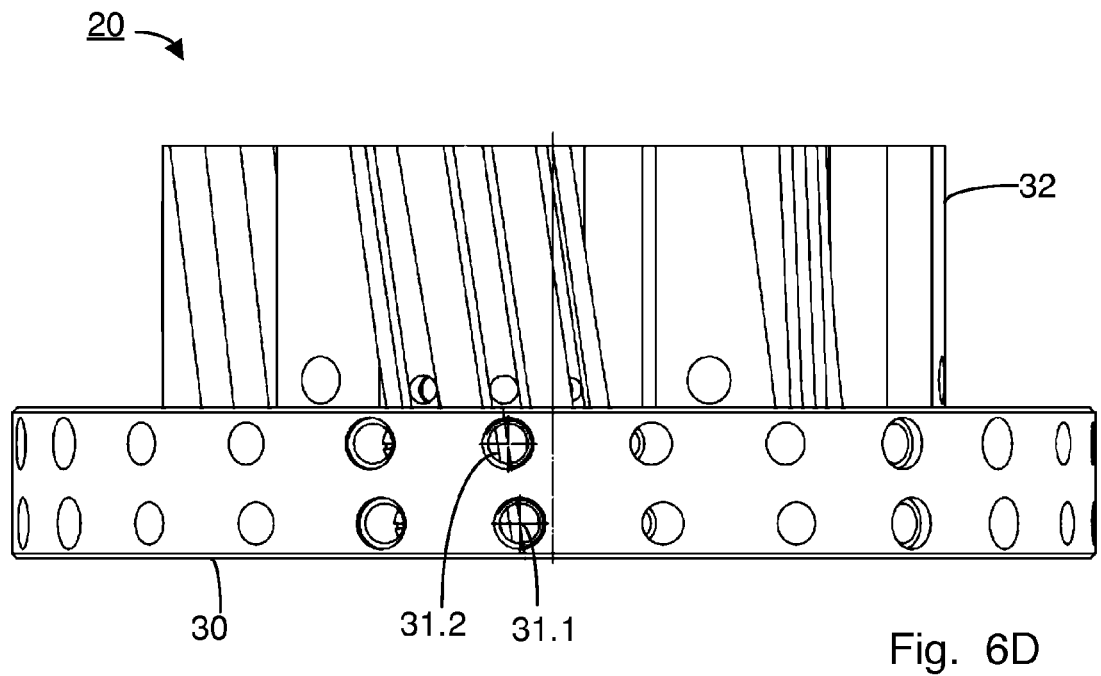
FIG. 6D is a detailed side view of the third cutter head according to the invention.

The diagonal shape of these receptacle openings is indicated in FIG. 6D. The fastening holes 31.1, 31.2 for the clamping screws are accordingly situated one above another slightly inclined in the axial direction.

Figure 6E:
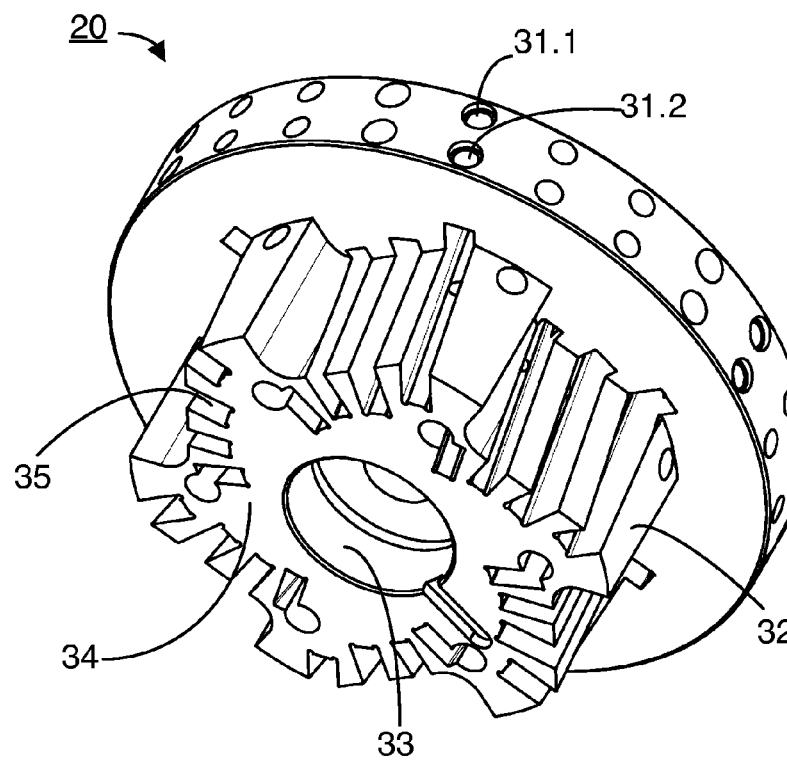
FIG. 6E is a perspective view of the third cutter head according to the invention.

It can be seen in FIG. 4E that a split rear side 32 of the cutter head 20 results through the incline of the bar cutters. The individual slotted extensions of the receptacle openings can be seen on the rear side. Such a slot is identified by the reference number 35 in FIG. 6E.

In the cutter head 20 according to the invention, precisely manufactured slots are preferably used as the receptacle openings for the exact radial and angular fixing of the positions of the bar cutters. The receptacle openings form so-called cutter chambers for the exact radial and angular fixing of the positions and for the fastening of the bar cutters using clamping screws, for example.

Spacer plates may preferably be laid in the cutter chambers in order to be able to displace the bar cutters radially in the particular receptacle openings in small steps (corresponding to the thickness of the spacer plates). This approach having the spacer plates, which are also referred to as parallel plates, has been known for some time and has already been used in older cutter heads.

Clamping wedges may also be used for positioning and fastening the bar cutters, which are preferably inserted into the receptacle openings diagonally to the axial direction of the cutter head 20.

The bar cutters typically have a cutter shaft having a rectangular or prismatic cross-section. The receptacle openings of the cutter head 20 therefore have a corresponding cross-section, which is preferably complementary. The cutter shafts may also have a concave or convex surface, however. The shape of the receptacle openings is preferably also adapted accordingly in this case.

The outer diameter of the cutter head 20 according to the invention results from the greatest cutter head nominal diameter which can be housed on the cutter head 20. If the greatest cutter head nominal diameter is 7.5" (7.5 inches=190.5 mm), for example, the outer diameter is preferably approximately 268 mm. If the greatest cutter head nominal diameter is 3.75" (3.75 inches=95.25 mm), for example, the outer diameter is preferably approximately 165 mm.

Figure 1A:
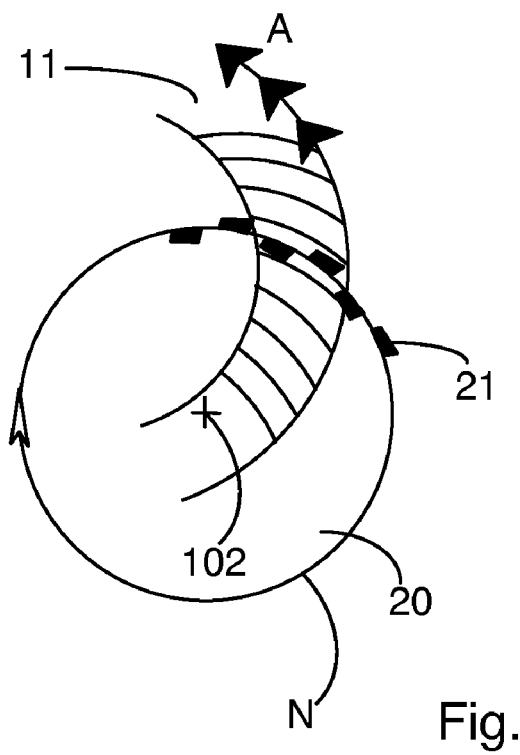
FIG. 1A is a schematic illustration of the single indexing method.
Figure 1B:
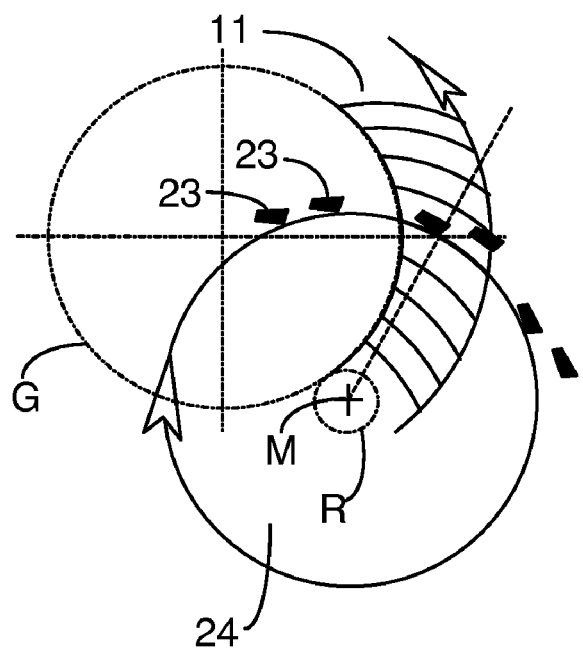
FIG. 1B is a schematic illustration of the continuous indexing method.

The present invention relates to universally usable cutter heads 20 for employment in the single indexing method (according to the principle of FIG. 1A). The bar cutters 21 such a cutter head 20 complete a spiraling movement while the bevel gear 11 to be produced rests in a fixed angle position. A tooth gap is machined until the final geometry is produced in one milling pass. To manufacture further tooth gaps, the bar cutter head 20 is retracted and the workpiece 11 is rotated by an indexing angle. Therefore, one tooth gap is always manufactured at a time.

In a particularly preferred embodiment, the receptacle openings (slots) may be identical in geometry to those of a conventional cutter head. This embodiment has the advantage that with equal cutter head nominal radius for the same bevel gear teeth, the bar cutters may be exchanged between the conventional cutter head and the universal cutter head 24 according to the invention. The cutter head 24 according to the invention receives fewer bar cutters than the conventional cutter head, however. This embodiment has the advantages that the calculation and data storage, but also storage and handling, are significantly simplified.

The invention may particularly also be applied to the so-called completing method (for example, in the TwinBlade system) and the semi-completing method. The completing method is a single indexing method used in mass production. The completing method is distinguished in relation to other single indexing methods by a higher productivity.

Of course, the invention may also be applied to more than 4 nominal radii cutter groups, as long as the stability of the cutter head is not endangered by the number of recesses therein.

LIST OF REFERENCE NUMERALS position of the outer cutters of the first cutter group 1
position of the outer cutters of the third cutter group 2
position of the outer cutters of the second cutter group 3
position of the outer cutters of the fourth cutter group 4
position of the inner cutters of the first cutter group 5
position of the inner cutters of the third cutter group 6
position of the inner cutters of the second cutter group 7
position of the inner cutters of the fourth cutter group 8
bevel gear pinion 11
bar cutter head 20
bar cutter 21
cutter head 24
receptacle openings for the bar cutters of a first cutter group 25.1-25.6
receptacle openings for the bar cutters of the second cutter group 26.1-26.6
receptacle openings for the bar cutters of a third cutter group 27.1-27.6
receptacle openings for the bar cutters of a fourth cutter group 28.1-28.6
plate-shaped head area 30
screw openings for clamping screws 31.1, 31.2
cylindrical rear area 32
central hole 33
rear side 34
slot 35
CNC machine 100
spindle drive 101
tool spindle axis 102
first carriage 103
machine bed 104
guide 105
machine bed 106
second carriage 108
pivot device 109
machine housing 110
tool spindle 111
workpiece spindle 112
workpiece spindle axis 113
number of the bar cutters of the first cutter group n
number of the bar cutters of the second cutter group m
number of the bar cutters of the third cutter group k
number of the bar cutters of the fourth cutter group j
first indexing rotation A
second indexing rotation B
third indexing rotation C
main circle G
cutter head centerpoint M
rolling circle R

The invention claimed is:

1. A cutter head comprising a bar cutter head (20) for frontally receiving multiple bar cutters of a first bar cutter set, the bar cutter head (20) having
    n receptacle openings (25.1-25.6) for receiving n bar cutters of the first bar cutter set, the n receptacle openings (25.1-25.6) are all situated along a first concentric cutter head nominal circle having a first cutter head nominal radius (r1) corresponding to milling a first spiral-toothed bevel gear (11) using these n bar cutters in the single indexing method,
    wherein
    the bar cutter head (20) additionally has at least m receptacle openings (26.1-26.6) for receiving m bar cutters of a second bar cutter set, the m receptacle openings (26.1-26.6) are all situated along a second concentric cutter head nominal circle having a second cutter head nominal radius (r2) corresponding to milling a second spiral-toothed bevel gear using only these m bar cutters in the single indexing method, and
    n and m are whole numbers greater than two and the second cutter head nominal radius (r2) is greater than the first cutter head nominal radius (r1).

2. A cutter head according to claim 1, characterized in that the bar cutter head (20) additionally has at least k receptacle openings (27.1-27.6) for receiving k bar cutters of a third bar cutter set, which are all situated along a third concentric cutter head nominal circle having a third cutter head nominal radius (r3) corresponding to milling a third spiral-toothed bevel gear using only these k bar cutters in the single indexing method, k being a whole number greater than or equal to two.

3. A cutter head according to claim 2, characterized in that the bar cutter head (20) additionally has at least j receptacle openings (28.1-28.6) for receiving j bar cutters of a fourth bar cutter set, which are all situated along a fourth concentric cutter head nominal circle having a fourth cutter head nominal radius (r4) corresponding to milling a fourth spiral-toothed bevel gear using only these j bar cutters in a single indexing method, j being a whole number greater than two.

4. A cutter head according to claim 2, characterized in that
    n is equal to six, and the receptacle openings (25.1-25.6) for receiving the n=6 bar cutters of the first bar cutter set have a mutual angle spacing of 60°;
    m is equal to six, and the receptacle openings (26.1-26.6) for receiving the m=6 bar cutters of the second bar cutter set have a mutual angle spacing of 60°, and
    the receptacle openings (26.1-26.6) for receiving the m=6 bar cutters of the second bar cutter set are situated shifted in angle by at least 15° relative to the receptacle openings (25.1-25.6) for receiving the n=6 bar cutters of the first bar cutter set.

5. A cutter head according to claim 1, characterized in that n is equal to six, and the receptacle openings (25.1-25.6) for receiving the n=6 bar cutters of the first bar cutter set have a mutual angle spacing of 60°, the receptacle openings (25.1-25.6) always being laid out alternately along the first concentric cutter head nominal circle for receiving an outer-cutting bar cutter and an inner-cutting bar cutter;

m is equal to six, and the receptacle openings (26.1-26.6) for receiving the m=6 bar cutters of the second bar cutter set have a mutual angle spacing of 60°, the receptacle openings (26.1-26.6) always being laid out alternately along the second concentric cutter head nominal circle for receiving an outer-cutting bar cutter and an inner-cutting bar cutter the receptacle openings (26.1-26.6) for receiving the m=6 bar cutters of the second bar cutter set being situated shifted in angle by at least 15° relative to the receptacle openings (25.1-25.6) for receiving the n=6 bar cutters of the first bar cutter set.

6. A cutter head according to claim 5, wherein the bar cutter head has at least k receptacle openings (27.1-27.6) for receiving k bar cutters of a third bar cutter set, which are all situated along a third concentric cutter head nominal circle having a third cutter head nominal radius (r3) corresponding to milling a third spiral-toothed bevel gear using only these k bar cutters in the single indexing method, k being a whole number greater than two and further characterized in that k is equal to six, and the receptacle openings (27.1-27.6) for receiving the k=6 bar cutters of the third bar cutter set have a mutual angle spacing of 60°, the receptacle openings (27.1-27.6) always being laid out along the third concentric cutter head nominal circle alternately for receiving an outer-cutting bar cutter and an inner-cutting bar cutter.

7. A cutter head according to claim 6, wherein the cutter head (20) additionally has at least j receptacle openings (28.1-28.6) for receiving j bar cutters of a fourth bar cutter set, which are all situated along a fourth concentric cutter head nominal circle having a fourth cutter head nominal radius (r4) corresponding to milling a fourth spiral-toothed bevel gear using only these j bar cutters in a single indexing method, j being a whole number greater than two, and characterized in that j is equal to six, and the receptacle openings (28.1-28.6) for receiving the j=6 bar cutters of the fourth bar cutter set have a mutual angle spacing of 60°, the receptacle openings (28.1-28.6) always being laid out alternately along the fourth concentric cutter head nominal circle for receiving an outer-cutting bar cutter and an inner-cutting bar cutter.

8. Use of a bar cutter head (20) for manufacturing spiral-toothed bevel gears (11) having different tooth geometries, the bar cutter head (20) comprising:

n receptacle openings (25.1-25.6) for receiving n bar cutters of a first bar cutter set, which are all situated along a first concentric cutter head nominal circle having a first cutter head nominal radius (r1) corresponding to milling a first spiral-toothed bevel gear (11) using these n bar cutters in the single indexing method characterized in that the bar cutter head (20) additionally comprises:

at least m receptacle openings (26.1-26.6) for receiving m bar cutters of a second bar cutter set, which are all situated along a second concentric cutter head nominal circle having a second cutter head nominal radius (r2) in order to be able to mill a second spiral-toothed bevel gear using only these m bar cutters in the single indexing method, n and m being whole numbers greater than two and the second cutter head nominal radius (r2) being greater than the first cutter head nominal radius (r1).

9. Use according to claim 8, characterized in that the bar cutter head (20) additionally comprises:

at least k receptacle openings (27.1-27.6) for receiving k bar cutters of a third bar cutter set, which are all situated along a third concentric cutter head nominal circle having a third cutter head nominal radius (r3) corresponding to milling a third spiral-tooth bevel gear using only these k bar cutters in the single indexing method, k being a whole number greater than two.

10. Use according to claim 8, characterized in that the first spiral-toothed bevel gear (11) has a different tooth geometry than the second spiral-toothed bevel gear, and/or than the third spiral-toothed bevel gear.

* * * * *